US008313287B2

(12) United States Patent
Little

(10) Patent No.: US 8,313,287 B2
(45) Date of Patent: Nov. 20, 2012

(54) TURBINE BLADE SQUEALER TIP RAIL WITH FENCE MEMBERS

(75) Inventor: David A. Little, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 719 days.

(21) Appl. No.: 12/486,249

(22) Filed: Jun. 17, 2009

(65) Prior Publication Data

US 2012/0201695 A1 Aug. 9, 2012

(51) Int. Cl.
*F01D 5/20* (2006.01)
*F01D 5/18* (2006.01)
*F04D 29/08* (2006.01)
*B64C 11/24* (2006.01)
*B63H 1/26* (2006.01)

(52) U.S. Cl. .................... 415/173.1; 416/92; 416/236 R

(58) Field of Classification Search .................... 416/92, 416/174, 228, 235, 236 R, 223 A; 415/173.1, 415/173.4

See application file for complete search history.

(56) References Cited

U.S. PATENT DOCUMENTS 5,660,524 A 8/1997 Lee et al.
5,738,491 A * 4/1998 Lee et al. ...................... 415/177
5,997,251 A 12/1999 Lee
6,036,441 A 3/2000 Manning et al.
6,059,530 A 5/2000 Lee
6,179,556 B1 * 1/2001 Bunker ......................... 415/115
6,186,741 B1 2/2001 Webb et al.
6,224,337 B1 5/2001 Lieland et al.
6,431,832 B1 8/2002 Glezer et al.
6,478,537 B2 11/2002 Junkin
6,494,678 B1 12/2002 Bunker
6,672,829 B1 1/2004 Cherry et al.
6,790,005 B2 9/2004 Lee et al.
6,837,683 B2 1/2005 Dailey
6,991,430 B2 1/2006 Stec et al.
7,029,235 B2 4/2006 Liang
7,163,373 B2 1/2007 Liang
7,168,921 B2 1/2007 Honkomp et al.

(Continued)

FOREIGN PATENT DOCUMENTS

EP 2141327 A2 * 1/2010

(Continued)

OTHER PUBLICATIONS

George Liang; Gas Turbine Blade with Double Impingement Cooled Single Suction Side Tip Rail; USPTO U.S. Appl. No. 12/464,450, filed May 12, 2009; 21 pages.

(Continued)

*Primary Examiner* — Dwayne J White
*Assistant Examiner* — Su Htay

(57) ABSTRACT

A turbine blade includes an airfoil, a blade tip section, a squealer tip rail, and a plurality of chordally spaced fence members. The blade tip section includes a blade tip floor located at an end of the airfoil distal from the root. The blade tip floor includes a pressure side and a suction side joined together at chordally spaced apart leading and trailing edges of the airfoil. The squealer tip rail extends radially outwardly from the blade tip floor adjacent to the suction side and extends from a first location adjacent to the airfoil trailing edge to a second location adjacent to the airfoil leading edge. The fence members are located between the airfoil leading and trailing edges and extend radially outwardly from the blade tip floor and axially from the squealer tip rail toward the pressure side.

20 Claims, 8 Drawing Sheets

U.S. PATENT DOCUMENTS

| | | | | |
|---|---|---|---|---|
| 7,270,515 | B2 | 9/2007 | Liang | |
| 7,290,986 | B2 | 11/2007 | Stegemiller et al. | |
| 7,431,562 | B2 | 10/2008 | Hooper et al. | |
| 7,473,073 | B1 * | 1/2009 | Liang | 415/173.5 |
| 7,494,319 | B1 | 2/2009 | Liang | |
| 8,113,779 | B1 * | 2/2012 | Liang | 416/92 |
| 2007/0128030 | A1 | 6/2007 | Liang | |
| 2007/0258815 | A1 | 11/2007 | Liang | |
| 2008/0118363 | A1 | 5/2008 | Lee et al. | |
| 2008/0118367 | A1 | 5/2008 | Liang et al. | |

FOREIGN PATENT DOCUMENTS

GB 2155558 A * 9/1985

OTHER PUBLICATIONS

George Liang; Turbine Blade with Single Tip Rail with a Mid-Positioned Deflector Portion; USPTO U.S. Appl. No. 12/464,476, filed May 12, 2009; 17 pages.

* cited by examiner

TURBINE BLADE SQUEALER TIP RAIL WITH FENCE MEMBERS

This invention was made with U.S. Government support under Contract Number DE-FC26-05NT42644 awarded by the U.S. Department of Energy. The U.S. Government has certain rights to this invention.

FIELD OF THE INVENTION

The present invention relates generally to turbine blades and, more particularly, to cooling of a blade tip section of a turbine blade.

BACKGROUND OF THE INVENTION

In a turbomachine, such as a gas turbine engine, air is pressurized in a compressor then mixed with fuel and burned in a combustor to generate hot combustion gases. The hot combustion gases are expanded within a gas turbine of the engine where energy is extracted to power the compressor and to produce useful work, such turning a generator to produce electricity. The hot combustion gases travel through a series of turbine stages. A turbine stage may include a row of stationary vanes followed by a row of rotating turbine blades, where the turbine blades extract energy from the hot combustion gases for powering the compressor and providing output power. Since the turbine blades are directly exposed to the hot combustion gases, they are typically provided with internal cooling circuits which channel a coolant, such as compressor bleed air, through the airfoil of the blade and through various film cooling holes around the surface thereof. One type of airfoil extends from a root at a blade platform, which defines the radially inner flow path for the combustion gas, to a radially outer cap or blade tip section, and includes opposite pressure and suction sides extending axially from leading to trailing edges of the airfoil. The cooling circuit extends inside the airfoil between the pressure and suction sides and is bounded at its top by the blade tip section.

The gas turbine engine efficiency is, at least in part, dependent upon the extent to which the high temperature gases leak across the gap between the turbine blade tips and the seals or shrouds which surround them. The leakage quantity is typically minimized by positioning the radially-outward blade tip section in close proximity to the outer air seal. However, differential thermal elongation and dynamic forces between the blade tip section and outer air seal can cause rubbing therebetween. Also, it should be noted that the heat load on the turbine blade tip section is a function of leakage flow over the blade tip section. Specifically, a high leakage flow will induce a high heat load to the blade tip section, such that gas leakage across the blade tip section and cooling of the blade tip section have to be addressed as a single problem. In a typical construction, see FIG. 9, the blade tip section 204 of an airfoil 200 has been provided with a squealer tip rail 202 extending radially outwardly a short distance from the blade tip section 204, and extending substantially completely around the perimeter of the airfoil 200 to define an inner squealer tip pocket 206 facing radially outwardly. The squealer tip rail 202 is provided for spacing radially closely adjacent to the stationary outer seal wall, or outer turbine shroud, to provide a relatively small clearance gap therebetween to seal or restrict the flow of gas across the blade tip section 204.

The squealer tip rail 202 is a solid metal projection of the airfoil 200, and is directly heated by the combustion gas which flows thereover, as illustrated by flow lines 208. In addition, a vortex flow 210 of hot gases may be formed on the suction side of the airfoil 200 adjacent the blade tip. The squealer tip rail 202 is cooled by a cooling fluid, such as air, channeled from an airfoil cooling circuit to the blade tip section 204 to convect heat away from the area of the squealer tip pocket 206. Convective cooling holes 214 may be provided in the squealer tip pocket 206 located along the squealer tip rail 202, as illustrated in FIG. 9. In addition, heat from the squealer tip rail 202 may be conducted into the squealer tip section 204 and convected away internally of the airfoil 200 by the cooling fluid channeled through the internal cooling circuit. The squealer tip section 204, including the squealer tip rail 202, typically operates at temperatures above that of the remainder of the airfoil 200 and can be a life limiting element of the airfoil 200 in a hot turbine environment. In particular, it is known in the art that the portion of the airfoil 200 located at the intersection of the pressure side airfoil surface 218 and the blade tip section 204 is subject to very high heat loads and accordingly is more likely to experience thermal distress.

Cooling to the pressure side airfoil surface 218 may be provided by a row of film cooling holes 216 located on the pressure side of the airfoil outer wall, extending from the leading edge to the trailing edge of the airfoil 200, immediately below the blade tip section 204 for providing a cooling fluid film which flows upwardly over the pressure side of the airfoil 200.

SUMMARY OF THE INVENTION

In accordance with one aspect of the invention, a turbine blade is provided. The turbine blade comprises an airfoil including an airfoil outer wall extending radially outwardly from a blade root, a blade tip section including a blade tip floor located at an end of the airfoil distal from the root, and a squealer tip. The blade tip floor includes a pressure side and a suction side joined together at chordally spaced apart leading and trailing edges of the airfoil. The squealer tip extends radially outwardly from the blade tip floor and comprises a squealer tip rail and a plurality of chordally spaced fence members. The squealer tip rail is located adjacent to the suction side and extends from a first location adjacent to the airfoil trailing edge to a second location adjacent to the airfoil leading edge. The fence members are located between the airfoil leading and trailing edges. Each of the fence members extends from the squealer tip rail toward the pressure side.

In accordance with a second aspect of the invention, a turbine blade is provided. The turbine blade comprises an airfoil including an airfoil outer wall extending radially outwardly from a blade root, a blade tip section including a blade tip floor located at an end of the airfoil distal from the root, and a squealer tip. The blade tip floor includes a pressure side and a suction side joined together at chordally spaced apart leading and trailing edges of the airfoil. The squealer tip extends radially outwardly from the blade tip floor and comprises a squealer tip rail and a plurality of chordally spaced fence members. The squealer tip rail is located adjacent to the suction side and extends from a first location adjacent to the airfoil trailing edge to a second location adjacent to the airfoil leading edge. The fence members are located between the airfoil leading and trailing edges. Each of the fence members extends from the squealer tip rail toward the pressure side. The fence members are curved in an axial direction. A concave side of each of the curved fence members faces the airfoil leading edge. The fence members define pockets extending from the squealer tip rail.

In accordance with a third aspect of the invention, a turbine blade is provided. The turbine blade comprises an airfoil including an airfoil outer wall extending radially outwardly from a blade root, a blade tip section including a blade tip floor located at an end of the airfoil distal from the root, and a squealer tip. The blade tip floor includes a pressure side and a suction side joined together at chordally spaced apart leading and trailing edges of the airfoil. The squealer tip extends radially outwardly from the blade tip floor and comprises a squealer tip rail and a plurality of chordally spaced fence members. The squealer tip rail is located adjacent to the suction side and extends from a first location adjacent to the airfoil trailing edge to a second location adjacent to the airfoil leading edge. The fence members are located between the airfoil leading and trailing edges. Each of the fence members extends from the squealer tip rail toward the pressure side. The fence members comprise a leading edge facing radially extending surface and a trailing edge facing ramped surface defining a serrated tip surface of the blade tip section. The radially extending surfaces extend from the blade tip floor at a first radial location to a second radial location radially outwardly from the first location. The ramped surfaces are angled radially outwardly toward the airfoil leading edge from the first radial location to the second radial location.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

The present invention provides a construction for a blade tip section of a rotating blade located within a turbine section (not shown) of a gas turbine engine (not shown), where the blade tip section includes a squealer tip rail that is configured to reduce blade hot gas leakage flow over the squealer tip rail and heat load. The gas turbine engine typically further includes a compressor section (not shown) and a combustor section (not shown), which may include a plurality of combustor units (not shown). Ambient air is compressed in the compressor section, which air is combined with fuel and ignited in the combustor units to create combustion products comprising hot working gases. The working gases are routed through transition ducts to the turbine section. Within the turbine section are a series of rows of stationary vanes and rotating blades. The rotating blades are coupled to a shaft and disc assembly. As the working gases expand through the turbine section, the working gases cause the blades, and therefore the disc assembly, to rotate.

Figure 1:
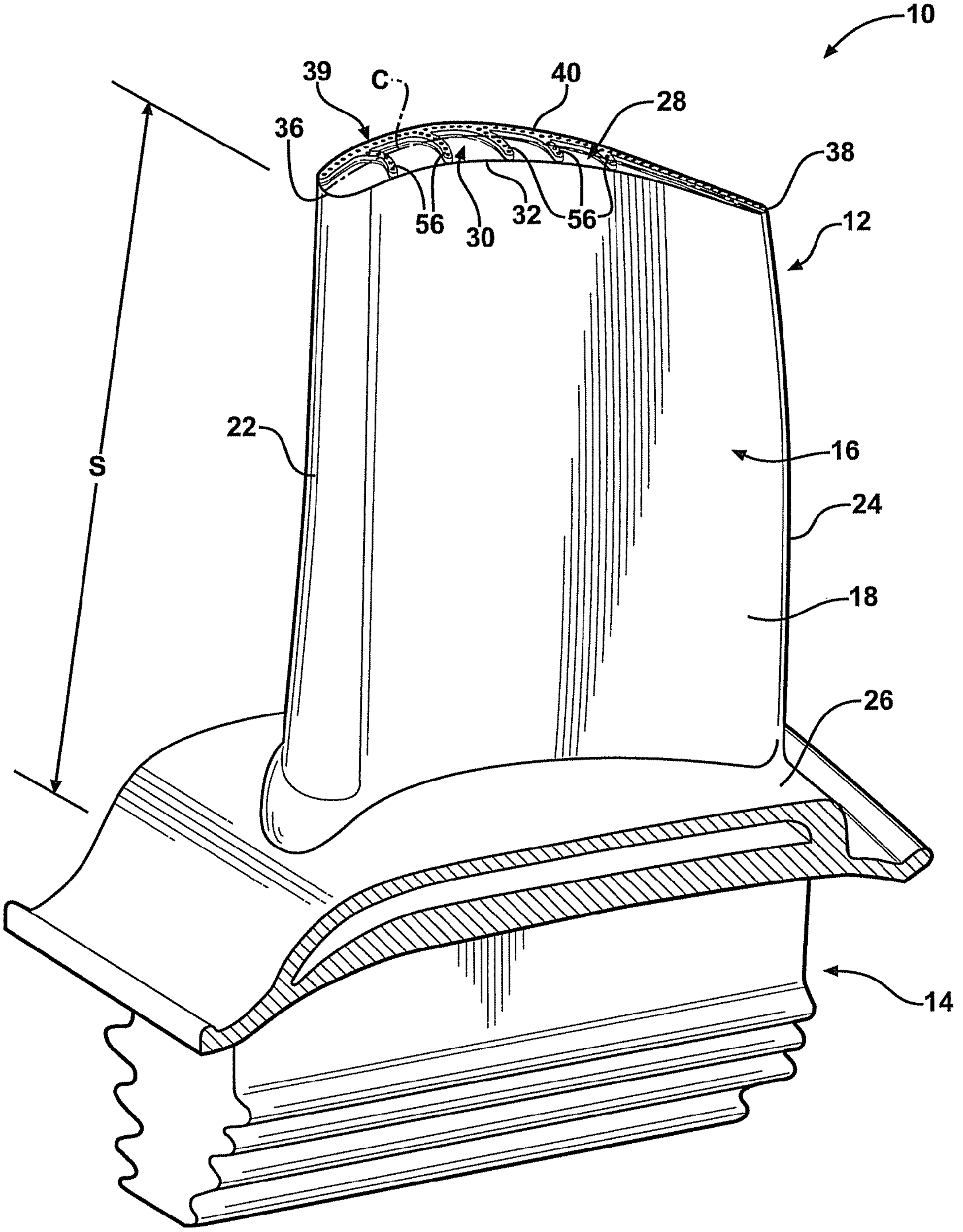
FIG. 1 is a perspective view of a turbine blade constructed in accordance with an embodiment of the present invention.

Referring to FIG. 1, an exemplary turbine blade 10 constructed in accordance with a first embodiment of the present invention is illustrated. The blade 10 includes an airfoil 12 and a root 14, which is used to conventionally secure the blade 10 to the shaft and disc assembly of the turbine section for supporting the blade 10 in the working gas flow path of the turbine section. The airfoil 12 has an outer wall 16 comprising a pressure sidewall 18 and a suction sidewall 20, see FIGS. 1 and 2. The pressure and suction sidewalls 18, 20 are joined together along an upstream airfoil leading edge 22 and a downstream airfoil trailing edge 24, where the leading and trailing edges 22, 24 are spaced axially or chordally from each other with respect to a chordal direction C, see FIG. 1. The airfoil 12 extends radially along a longitudinal or radial direction of the blade 10, defined by a span S of the airfoil 12, from a radially inner airfoil platform 26 to a radially outer squealer tip cap or squealer tip section 28.

Figure 2:
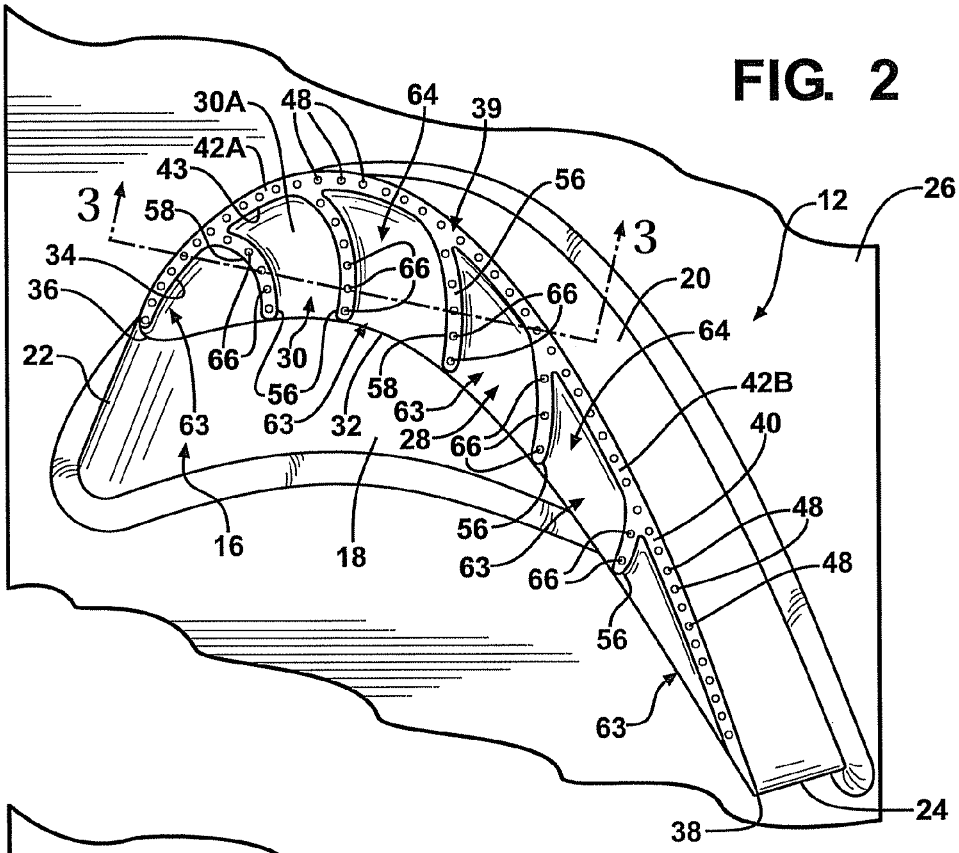
FIG. 2 is a top view of the turbine blade illustrated in FIG. 1.

The squealer tip section 28 includes a blade tip floor 30 having an airfoil shape and pressure and suction sides 32, 34, which are joined together at chordally spaced apart leading and trailing edges 36, 38 of the squealer tip section 28, see FIG. 2. The pressure and suction sides 32, 34 are located adjacent to the pressure and suction sidewalls 18, 20, respectively, of the airfoil 12.

Figure 3:
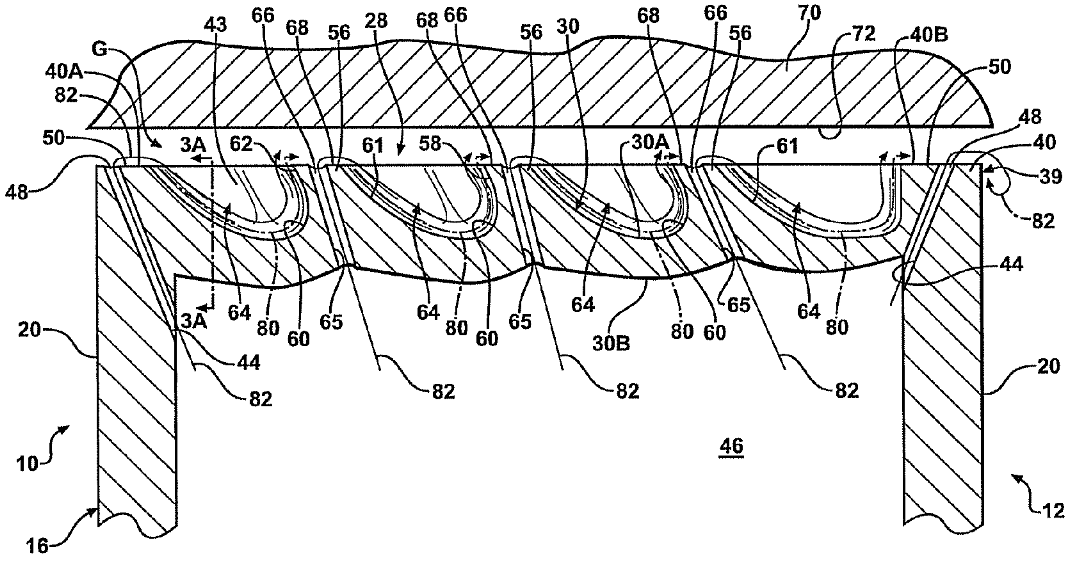
FIG. 3 is a sectional view taken along section line 3-3 in FIG. 2.

A squealer tip 39 extends radially outwardly from the blade tip floor 30, see FIGS. 1, 2, and 3. It is noted that the blade tip floor 30 and the squealer tip 39 may be separately formed and affixed together, e.g., welded, or the blade tip floor 30 and the squealer tip 39 may be integrally formed as a single unit, as shown in FIG. 3.

Figure 3A:
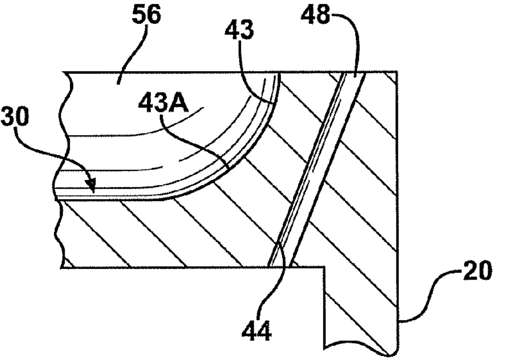
FIG. 3A is sectional view taken along section line 3A-3A in FIG. 3.

The squealer tip 39 includes a squealer tip rail 40 that extends radially outwardly from the blade tip floor 30 substantially adjacent to the suction side 34. The squealer tip rail 40 comprises a first portion 42A that extends from the blade tip section leading edge 36 to a second portion 42B, and the second portion 42B extends from the first portion 42A to the blade tip section trailing edge 38. As shown in FIG. 3A, an inner wall 43 of the squealer tip rail 40 comprises a curved radially inner portion 43A having a concave side. The concave side faces the pressure side 32. The curved radially inner portion 43A merges with the blade tip floor 30 in a curved, smooth transition, as will be discussed below.

The squealer tip rail 40 includes a plurality of first cooling holes 44 formed therein that are each in communication with a cooling fluid circuit 46 of the airfoil 12, see FIG. 3. As shown in FIG. 3, the first cooling holes 44 include respective openings 48 formed in a radially outer end 50 of the squealer tip rail 40, which openings 48 discharge cooling air from the cooling fluid circuit 46 that flows through the respective first cooling holes 44. As shown in FIG. 3, the first cooling holes 44 may be angled from the cooling fluid circuit 46 toward the blade tip section leading edge 36. However, it is understood that the cooling holes 44 may be angled in other directions. The cooling holes 44 are spaced chordally apart from one another and extend from the cooling fluid circuit 46 to the radially outer end 50 of the squealer tip rail 40 to discharge the cooling fluid out of the respective openings 48. The cooling fluid circuit 46 may receive cooling fluid through the root 14, which cooling fluid, e.g., air, may be supplied by the compressor section of the engine. As shown in FIG. 3, the blade tip floor 30 forms a radially outer boundary for the cooling fluid circuit 46.

Referring to FIGS. 1 and 2, the squealer tip 39 further includes a plurality of fence members 56 that extend axially from the squealer tip rail 40 toward the pressure side 32, and in a preferred embodiment extend all the way to the pressure side 32. It is noted that the squealer tip rail 40 and the fence members 56 may be separately formed and affixed together, e.g., welded, or the squealer tip rail 40 and the fence members 56 may be integrally formed as a single unit, as shown in FIGS. 1-3.

The fence members 56 are curved in the axial direction such that a concave side 58 (see FIG. 2), e.g., a leading edge facing radially extending surface, of each of the fence members 56 faces the squealer tip section leading edge 36. Further, as shown in FIG. 3, the fence members 56 extend radially outwardly from the blade tip floor 30 at an angle in the radial direction toward the squealer tip section leading edge 36. That is, a curved radially inner base portion 60 of each of the fence members 56 is chordally offset from a radially outer portion 62 of each of the fence members 56, wherein the radially outer portion 62 of each of the fence members 56 is closer to the squealer tip section leading edge 36 than its corresponding radially inner base portion 60 at the same axial location. The curved radially inner base portions 60 of the fence members 56 merge into the blade tip floor 30 in a curved, smooth transition, as shown in FIG. 3. Further, a curved radially inner back portion 61 e.g., a trailing edge facing ramped surface, of each the fence members 56 merges into the blade tip floor 30 in a curved, smooth transition. As seen in FIG. 3, the fence members 56 generally define a serrated tip surface.

It is noted that the blade tip floor 30 may comprise a concave shape between adjacent fence members 56, and extending from the inner wall 43 of the squealer tip rail 40 to the pressure side 32 of the squealer tip section 28, as shown in FIGS. 2, 3, and 3A, wherein concave radially outer surfaces 30A of the blade tip floor 30 between adjacent fence members 56 face radially outwardly. The blade tip floor 30 has a radially outer extent located generally at the radial location of the concave radially outer surfaces 30A. Further, convex radially inner surfaces 30B of the blade tip floor 30, which are opposed from the concave radially outer surfaces 30A, define a radially inner extent of the blade tip floor 30 and face radially inwardly. The combination of the convex radially inner surfaces 30B with the concave radially outer surfaces 30A provides for a substantially uniform thickness of the blade tip floor 30. Thus, a substantially uniform resistance to heat flow from the concave radially outer surfaces 30A to the convex radially inner surfaces 30B is provided.

The concave radially outer surfaces 30A of the blade tip floor 30, in combination with the curved radially inner wall 43 of the squealer tip rail 40, the concave side 58 of the fence members 56, and with the curved radially inner base portions 60 and the curved radially inner back portions 61 of the fence members 56, create a series of continuously open pockets 64 extending from the squealer tip rail 40 to the pressure side 32 that provide for a smooth, recirculating flow path for hot working gases flowing over the blade tip section 28, as shown in FIG. 3. The pockets 64 are located radially outwardly from the blade tip floor 30 between the blade tip section pressure side 32, the squealer tip rail 40, and the fence members 56. It is noted that the pockets 64 have an open side 63 (see FIG. 2) adjacent to the blade tip section pressure side 32, as the blade tip section pressure side 32 is substantially without a squealer tip rail.

As shown in FIG. 3, the fence members 56 each include a plurality of second cooling holes 65 formed therein that are each in fluid communication with the cooling fluid circuit 46 of the airfoil 12. The second cooling holes 65 include respective openings 66 formed in a radially outer end 68 of each the fence members 56, which openings 66 discharge cooling air from the cooling fluid circuit 46 that flows through the respective second cooling holes 65. The cooling holes 65 are spaced apart from one another on the fence members 56 and extend from the cooling fluid circuit 46 to the radially outer end 68 of the respective fence member 56 to discharge the cooling air out of the respective openings 66. As shown in FIG. 3, the second cooling holes 65 may be angled toward the concave side 58 of each of the fence members 56, such that the cooling air is discharged therefrom at an angle toward the squealer tip section leading edge 36.

A fixed turbine blade outer air seal 70 surrounds the turbine blades 10. As illustrated in FIG. 3, a small clearance gap G is defined between the turbine blade squealer tip section 28 and an inner surface 72 of the turbine blade outer air seal 70.

Figure 2A:
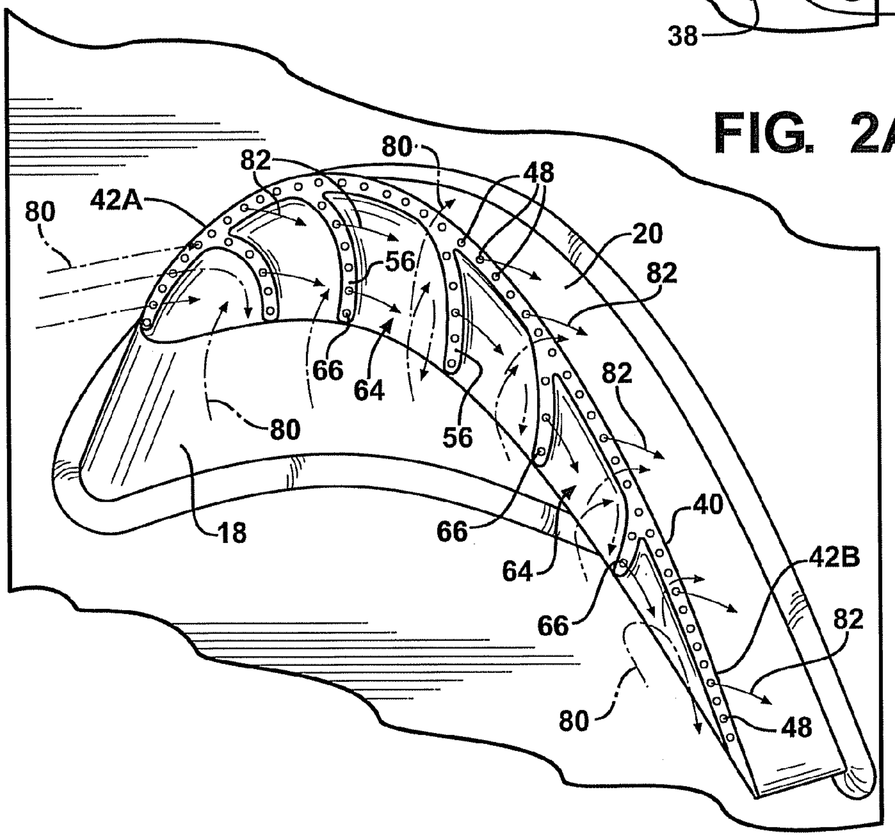
FIG. 2A is a view similar to FIG. 2 illustrating exemplary flow paths realized by the turbine blade illustrated in FIG. 1.

Referring to FIGS. 2A and 3, dotted-dashed arrows 80 indicate flow paths for hot working gases, and solid line arrows 82 indicate flow paths for cooling fluid exiting the first cooling holes 44 formed in the squealer tip rail 40 and the second cooling holes 65 formed in the fence members 56. It is noted that, because of a pressure differential between the airfoil pressure sidewall 18 and the airfoil suction sidewall 20, the hot working gases 80 flow radially outwardly along the airfoil pressure sidewall 18 and into the pockets 64.

As is apparent from FIG. 2A, cooling fluid 82 exiting the first cooling holes 44 formed in the squealer tip rail first portion 42A, along with the cooling fluid 82 exiting the second cooling holes 65 formed in the fence members 56 is turned, i.e., by the hot working gases 80, and caused to flow into the pockets 64, where the cooling fluid 82 mixes with the hot working gases 80 in the pockets 64. It is noted that the cooling fluid 82 exiting the first cooling holes 44 formed in the squealer tip rail first portion 42A, along with the cooling fluid 82 exiting the second cooling holes 65 formed in the fence members 56, forms a cooling film provided for the squealer tip rail 40, the fence members 56, and the blade tip floor 30. Cooling fluid 82 exiting the first cooling holes 44 formed in the squealer tip rail second portion 42B is turned away from the pockets 64 by the pressure differential between the airfoil pressure sidewall 18 and the airfoil suction sidewall 20 and by the hot working gases 80. The cooling fluid 82 passing through the first cooling holes 44 formed in the squealer tip rail second portion 42B provides “plug” cooling of the squealer tip rail 40, i.e., cools portions of the squealer tip rail 40 adjacent to the first cooling holes 44 as it passes through the first cooling holes 44.

As shown in FIG. 3, the mixture of the hot working gases 80 and the cooling fluid 82 in the pockets 64 is believed to create a vortex flow, wherein at least a portion of the combination of hot working gases 80 and cooling fluid 82 may be retained in the pockets 64. It is believed that a first portion of the mixture is forced out of the pockets 64 through the open sides 63 (FIG. 2), and that a second portion of the mixture leaks over the squealer tip rail 40 and flows through the gap G to the airfoil suction side 20. Specifically, the working gases 80 that enter the pockets 64 mix with the cooling fluid 82 and the mixture contacts the curved radially inner base portions 60 of each of the fence members 56. Upon contacting the curved radially inner base portions 60, the mixture creates a vortex flow within the pockets 64. A first portion of the mixture is directed away from the squealer tip rail 40 by the concave sides 58 of the fence members 56 and back toward the open sides 63. A second portion of the mixture, as a result of the pressure differential between the airfoil pressure and suction sides 18, 20, leaks over the squealer tip rail 40 and flows through the gap G to the airfoil suction side 20.

Referring to FIG. 2A, the configuration of the squealer tip rail 40 and the fence members 56 results in a flow path for the hot working gases 80, such that a substantial portion the hot working gases 80 are required to overcome at least two radially outwardly extending members to pass through the gap G to reach the airfoil suction side 20. That is, the hot working gases 80 are required to overcome at least one of the fence members 56, in addition to overcoming the squealer tip rail 40 to reach the airfoil suction side 20, as illustrated in FIG. 2A. Thus, the amount of hot working gases 80 that pass through the gap G to the airfoil suction side 20 is believed to be reduced.

Because the amount of hot working gases flowing through the gap G is minimized, the overall efficiency of the turbine may be increased, and the temperature of each turbine blade squealer tip section 28 may be reduced. Further, thermally induced stress at each turbine blade squealer tip section 28 may be minimized, the life expectancy of each of the blades 10 may be increased, and the amount of cooling fluid required to cool each turbine blade squealer tip section 28 may be minimized.

It is noted that, in the embodiment shown, the airfoil outer wall 16 may include an applied thermal barrier coating (TBC). However, the blade tip section 28, including the squealer tip rail 40 and the blade tip floor 30, are without a TBC.

Figure 4:
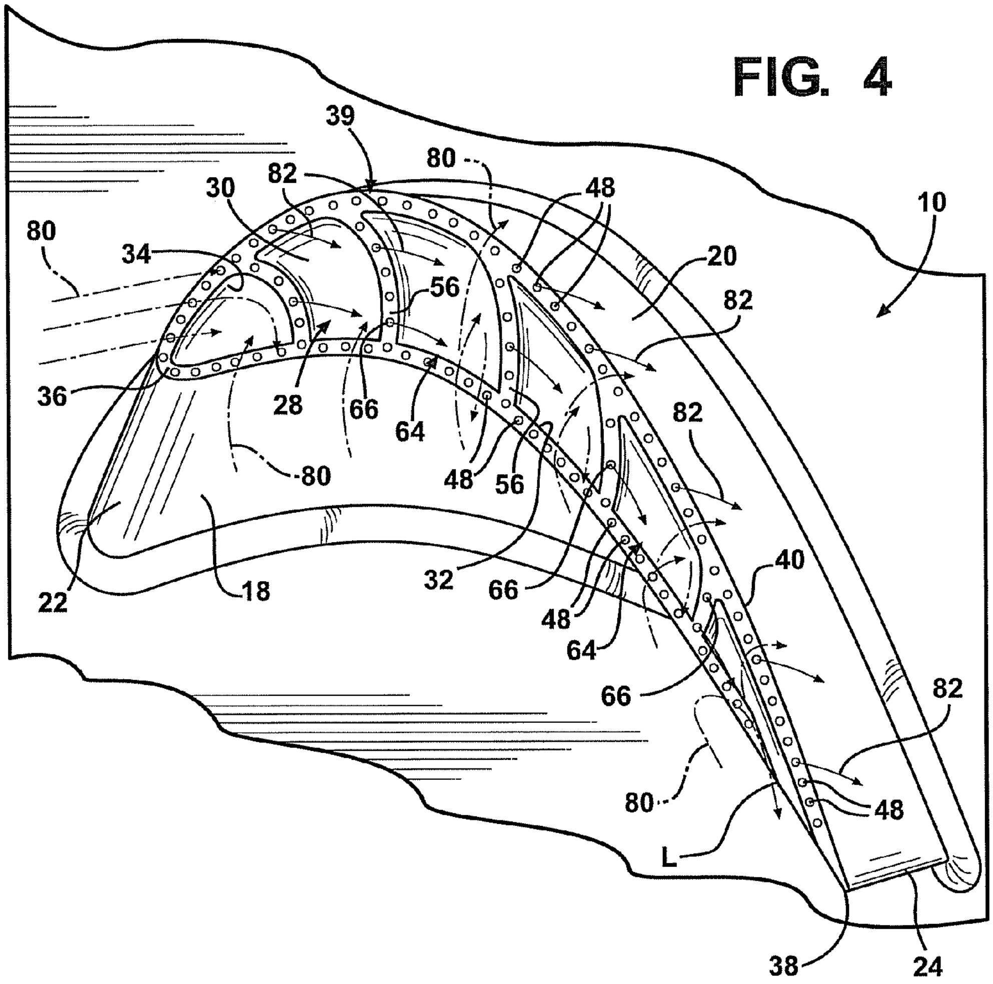
FIG. 4 is a top view of a turbine blade constructed in accordance with another embodiment of the present invention.

Referring to FIG. 4, a turbine blade 10 includes a squealer tip 39 according to another embodiment of the invention, where structure similar to that described above with reference to FIGS. 1, 2, 2A, 3, and 3A includes the same reference number. In this embodiment, the squealer tip 39 comprises a squealer tip rail 40 that extends radially outwardly from a blade tip floor 30 and extends along a suction side 34 of a squealer tip section 28 from a first location adjacent to an airfoil trailing edge 24 that corresponds to a blade tip section trailing edge 38, to a second location adjacent to an airfoil leading edge 22 that corresponds to a blade tip section leading edge 36. The squealer tip rail 40 also extends from the airfoil leading edge 22 substantially along a pressure side 32 of the squealer tip section 28. The portion of the squealer tip rail 40 that extends along the pressure side 32 terminates at a third location L adjacent to the airfoil trailing edge 24.

A plurality of fence members 56 of the squealer tip 39 according to this embodiment extend radially outwardly from the blade tip floor 30 and span between the portion of the squealer tip rail 40 that extends along the suction side 34 to the portion of the squealer tip rail 40 that extends along the pressure side 32.

First cooling holes (not shown) formed in the squealer tip rail 40 communicate with respective openings 48 formed in the squealer tip rail 40 to provide cooling fluid to cool the squealer tip section 28, as described above for FIGS. 1, 2, 2A, 3, and 3A. The cooling fluid is designated by solid line arrows 82 in FIG. 4. It is noted that the cooling fluid 82 provided by the cooling holes formed in the portion of the squealer tip rail 40 adjacent the pressure side 32 may flow into pockets 64 of the blade tip section 28 to provide cooling for the structure of the squealer tip section 28. The pockets 64 are formed in the squealer tip section 28 between the squealer tip rail 40 and the fence members 56.

Cooling fluid provided by second cooling holes (not shown) formed in the fence members 56 communicates with respective openings 66 formed in the fence members 56 to deliver cooling fluid 82 that is used to cool the squealer tip section 28, as described above for FIGS. 1, 2, 2A, 3, and 3A.

Remaining structure of the blade 10 according to this embodiment is substantially identical to that described above with reference to FIGS. 1, 2, 2A, 3, and 3A. However, during operation, hot working gases 80, designated by dotted-dashed arrows 80 in FIG. 4, that flow radially outwardly along a pressure side 18 of the blade, must pass over both the portion of the squealer tip rail 40 located along the pressure side 32 and the portion of the squealer tip rail 40 located along the suction side 34 (and any fence members 56 that the hot working gases 80 may encounter) to reach a suction side 20 of the blade. Thus, it is believed that the squealer tip 39 according to this embodiment provides increased resistance to leakage of hot working gases 80 over the squealer tip section 28 to the blade suction side 20.

Figure 5:
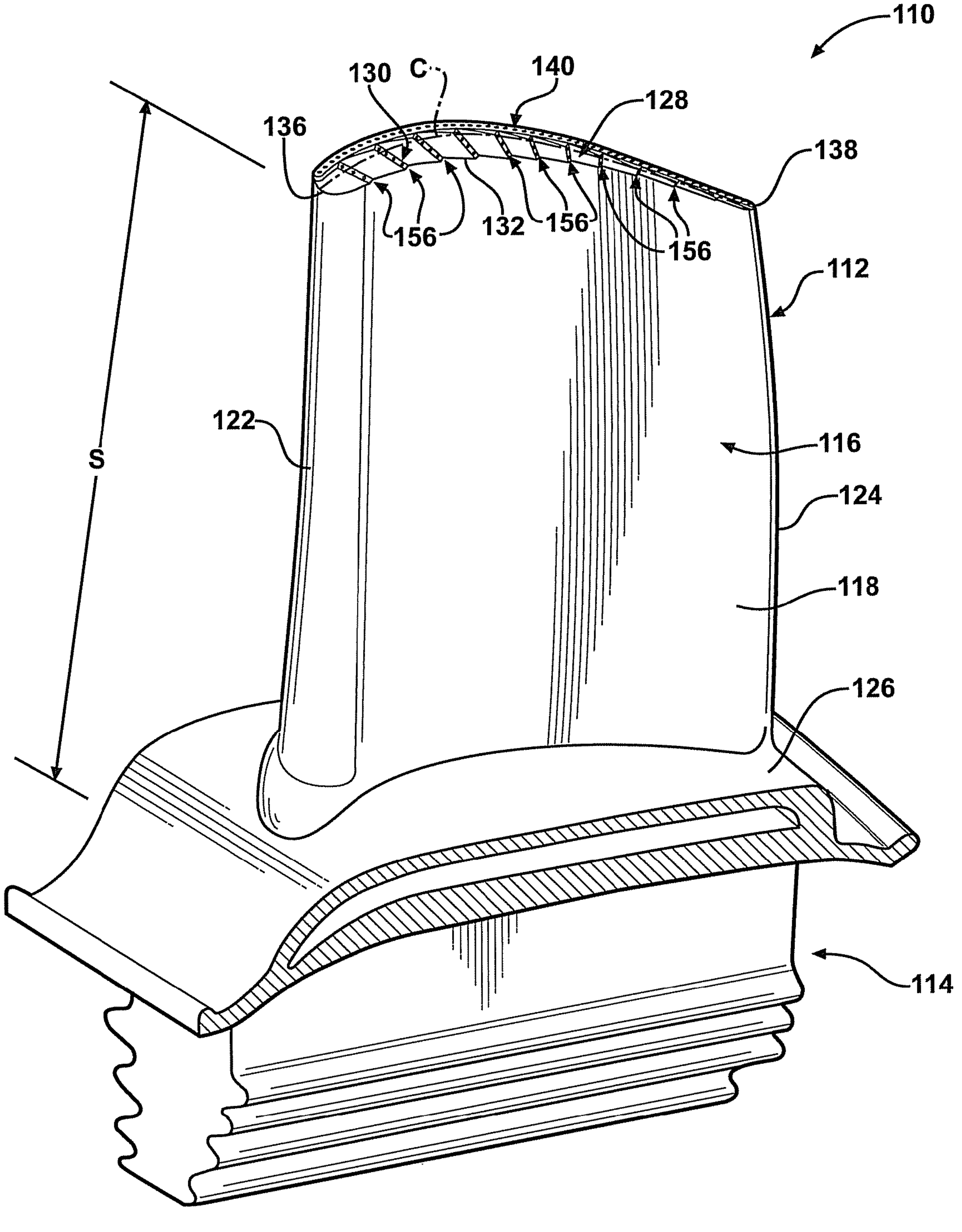
FIG. 5 is a perspective view of a turbine blade constructed in accordance with another embodiment of the present invention.

Referring to FIG. 5, an exemplary turbine blade 110 constructed in accordance with a second embodiment of the present invention is illustrated. The blade 110 includes an airfoil 112 and a root 114, which is used to conventionally secure the blade 110 to the shaft and disc assembly of the turbine section for supporting the blade 110 in the working gas flow path of the turbine section. The airfoil 112 has an outer wall 116 comprising a pressure sidewall 118 and a suction sidewall 120, see FIGS. 5 and 6. The pressure and suction sidewalls 118, 120 are joined together along an upstream airfoil leading edge 122 and a downstream airfoil trailing edge 124, where the leading and trailing edges 122, 124 are spaced axially or chordally from each other with respect to a chordal direction C, see FIG. 5. The airfoil 112 extends radially along a longitudinal or radial direction of the blade 110, defined by a span S of the airfoil 112, from a radially inner airfoil platform 126 to a radially outer squealer tip cap or squealer tip section 128.

Figure 6:
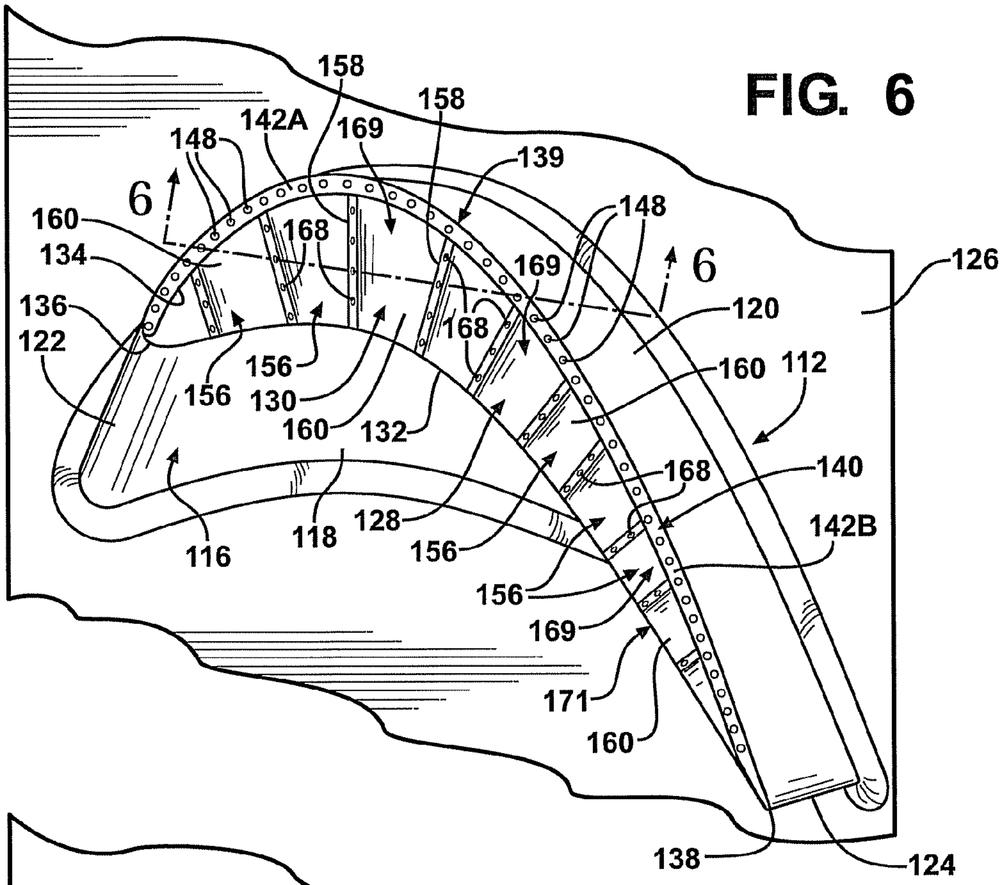
FIG. 6 is a top view of the turbine blade illustrated in FIG. 5.

The squealer tip section 128 includes a blade tip floor 130 having an airfoil shape and pressure and suction sides 132, 134, which are joined together at chordally spaced apart leading and trailing edges 136, 138 of the squealer tip section 128, see FIG. 6. The pressure and suction sides 132, 134 are located adjacent to the pressure and suction sidewalls 118, 120, respectively, of the airfoil 112.

Figure 7:
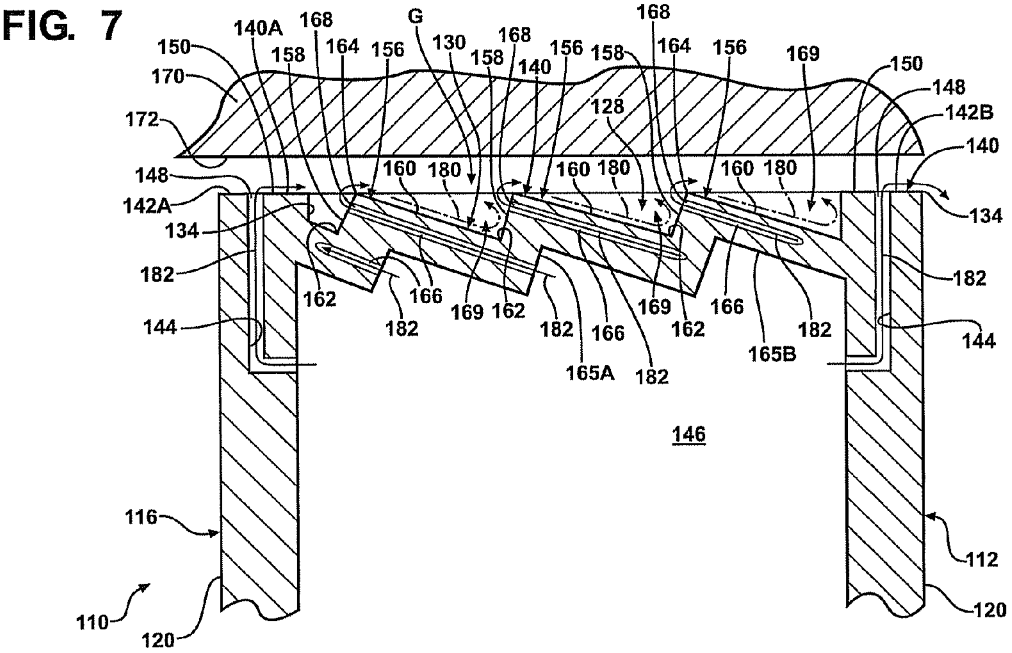
FIG. 7 is a sectional view taken along section line 7-7 in FIG. 6.

A squealer tip 139 extends radially outwardly from the blade tip floor 130, see FIGS. 5, 6, and 7. It is noted that the blade tip floor 130 and the squealer tip 139 may be separately formed and affixed together, e.g., welded, or the blade tip floor 130 and the squealer tip 139 may be integrally formed as a single unit, as shown in FIG. 7.

The squealer tip 139 includes a squealer tip rail 140 that extends radially outwardly from the blade tip floor 130 substantially adjacent to the suction side 134. The squealer tip rail 140 comprises a first portion 142A that extends from the blade tip section leading edge 136 to a second portion 142B, and the second portion 142B extends from the first portion 142A to the blade tip section trailing edge 138.

The squealer tip rail 140 includes a plurality of first cooling holes 144 formed therein that are each in communication with a cooling fluid circuit 146 of the airfoil 112, see FIG. 7. As shown in FIG. 7, the first cooling holes 144 include respective openings 148 formed in a radially outer end 150 of the squealer tip rail 140, which openings 148 discharge cooling air from the cooling fluid circuit 146 that flows through the respective first cooling holes 144. The first cooling holes 144 according to this embodiment may extend substantially radially inwardly and then turn toward the cooling fluid circuit 146 at a location radially inwardly from the blade tip floor 130. The cooling holes 144 are spaced chordally apart from one another and extend from the cooling fluid circuit 146 to the radially outer end 150 of the squealer tip rail 140 to discharge the cooling fluid out of the respective openings 148. The cooling fluid circuit 146 may receive cooling fluid through the root 114, which cooling fluid, e.g., air, may be supplied by the compressor section of the engine. As shown in FIG. 7, the blade tip floor 130 forms a radially outer boundary for the cooling fluid circuit 146.

Referring to FIGS. 6 and 7, the squealer tip 139 further comprises a series of ramped fence members 156 that extend axially between the squealer tip rail 140 and the pressure side 132. As shown in FIG. 7, each of the fence members 156 comprise a leading edge facing radially extending surface 158 and a trailing edge facing ramped surface 160. The radially extending surface 158 preferably comprises a sloped surface. The radially extending surface 158 extends from a first radial location 162 to a second radial location 164 radially outwardly from the first radial location 162, wherein the second radial location 164 defines a radially outermost edge of the turbine blade 110. The ramped surfaces 160 are angled radially outwardly toward the airfoil leading edge 122 from the first radial location 162 to the second radial location 164. A length of the ramped surfaces 160 from the first radial location 162 to the second radial location 164 is longer than a length of the radially extending surfaces 158 from the first radial location 162 to the second radial location 164. The series of ramped fence members 156 comprising radially extending surfaces 158 and ramped surfaces 160 defines a serrated tip surface for the squealer tip 139. It is noted that a radially outer edge 142A of the squealer tip rail 140 is located at a radial location substantially corresponding to the second radial location 164, such that the fence members 156 and the squealer tip rail 140 extend radially outwardly to about the same radial location.

The blade tip floor 130 has a radially outer extent located generally at the radial location of the first radial location 162. As shown in FIG. 7, the blade tip floor 130 comprises a series of first surfaces 165A opposed from the radially extending surfaces 158 and a series of second surfaces 165B opposed from the ramped surfaces 160. The first and second surfaces 165A, 165B define a radially inner extent of the blade tip floor 130.

As shown in FIG. 7, the fence members 156 each include a plurality of second cooling holes 166 formed therein that are each in fluid communication with the cooling fluid circuit 146 of the airfoil 112. The second cooling holes 166 include respective openings 168 formed in the radially extending surface 158 of each the fence members 156 adjacent to the second radial location 164, which openings 168 discharge cooling air from the cooling fluid circuit 146 that flows through the respective second cooling holes 166. The cooling holes 166 extend in a chordwise direction through the fence members 156 generally parallel to the ramped surfaces 160, as shown in FIG. 7.

The squealer tip rail 140, in combination with the radially extending and ramped surfaces 158, 160 of the fence members 156, create a series of continuously open pockets 169 extending from the squealer tip rail 140 to the pressure side 132, that are provided for discharging hot working gases flowing over the blade tip section 128 away from the squealer tip rail 140. The pockets 169 are located radially outwardly from the blade tip floor 130 between the blade tip section pressure side 132, the squealer tip rail 140, and the fence members 156. It is noted that the pockets 169 have an open side 171 (see FIG. 6) adjacent to the blade tip section pressure side 132, as the blade tip section pressure side 132 is substantially without a squealer tip rail.

A fixed turbine blade outer air seal 170 surrounds the turbine blades 110. As illustrated in FIG. 7, a small clearance gap G is defined between the turbine blade squealer tip section 128 and an inner surface 172 of the turbine blade outer air seal 170.

Figure 6A:
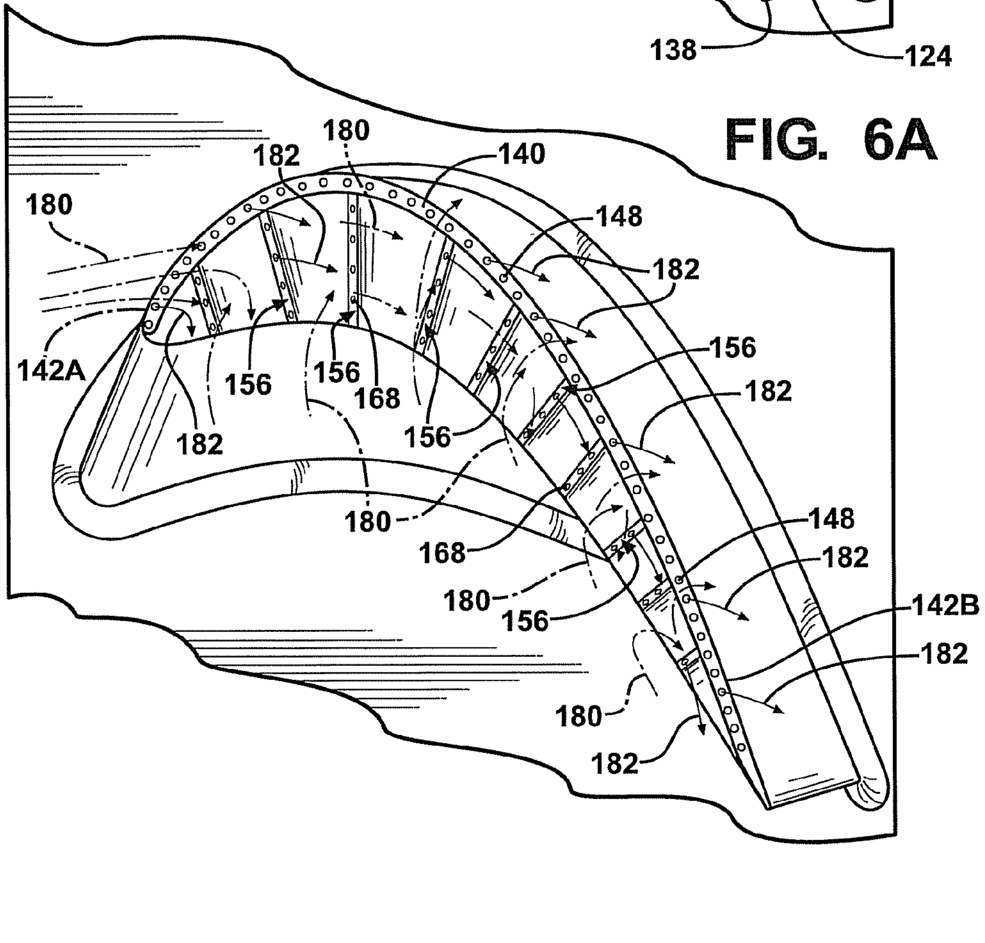
FIG. 6A is a view similar to FIG. 6 illustrating exemplary flow paths realized by the turbine blade illustrated in FIG. 5.

In FIGS. 6A and 7, dotted-dashed arrows 180 indicate flow paths for hot working gases and solid line arrows 182 designate cooling fluid exiting the first cooling holes 144 formed in the squealer tip rail 140 and the second cooling holes 168 formed in the fence members 156. It is noted that, because of a pressure differential between the airfoil pressure sidewall 118 and the airfoil suction sidewall 120, the hot working gases 180 flow radially outwardly along the airfoil pressure sidewall 118 and into the pockets 169.

As is apparent from FIG. 6A, cooling fluid 182 exiting the first cooling holes 144 formed in the squealer tip rail first portion 142A, along with the cooling fluid 182 exiting the second cooling holes 168 formed in the fence members 156, is turned, i.e., by the hot working gases 180, and caused to flow into the pockets 169, where the cooling fluid 182 mixes with the hot working gases 180 in the pockets 169. It is noted that the cooling fluid 182 exiting the first cooling holes 144 formed in the squealer tip rail first portion 142A, along with the cooling fluid 182 exiting the second cooling holes 166 formed in the fence members 156, forms a cooling film provided for the squealer tip rail 140, the fence members 156, and the blade tip floor 130. Cooling fluid 182 exiting the first cooling holes 144 formed in the squealer tip rail second portion 142B is turned away from the pockets 169 by the pressure differential between the airfoil pressure sidewall 118 and the airfoil suction sidewall 120 and by the hot working gases 180. The cooling fluid 182 passing through the first cooling holes 144 formed in the squealer tip rail second portion 142B provides "plug" cooling of the squealer tip rail 140, i.e., cools the portions squealer tip rail 140 adjacent to the first cooling holes 144 as it passes through the first cooling holes 144.

Referring to FIG. 6A, the configuration of the squealer tip rail 140 and the fence members 156 results in a flow path for the hot working gases 180, such that the hot working gases 180 are required to overcome at least two radially outwardly extending members to pass through the gap G to reach the airfoil suction side 120. That is, the hot working gases 180 are required to overcome at least one of the fence members 156, in addition to overcoming the squealer tip rail 140 to reach the airfoil suction side 120, as illustrated in FIG. 6A. The radially extending surfaces 158 of the fence members resist the flow of the hot working gases 180 thereover, which reduces the flow of the hot working gases 180 through the gap G and to the airfoil suction side 120. Additionally, the introduction of the cooling fluid 182 from the second cooling holes 168 formed in the fence members 156 in a direction toward the blade tip section leading edge 136 further reduces the flow of the hot working gases 180 over the fence members 156 and through the gap G to the airfoil suction side 120.

Because the amount of hot working gases flowing through the gap G is minimized, the overall efficiency of the turbine may be increased, and the temperature of each turbine blade squealer tip section 128 may be reduced. Further, thermally induced stress at each turbine blade squealer tip section 128 may be minimized, the life expectancy of each of the blades 110 may be increased, and the amount of cooling fluid required to cool each turbine blade squealer tip section 128 may be minimized.

It is noted that, in the embodiment shown, the airfoil outer wall 116 may include an applied thermal barrier coating (TBC). However, the blade tip section 128, including the squealer tip rail 140 and the blade tip floor 130, are without a TBC.

Figure 8:
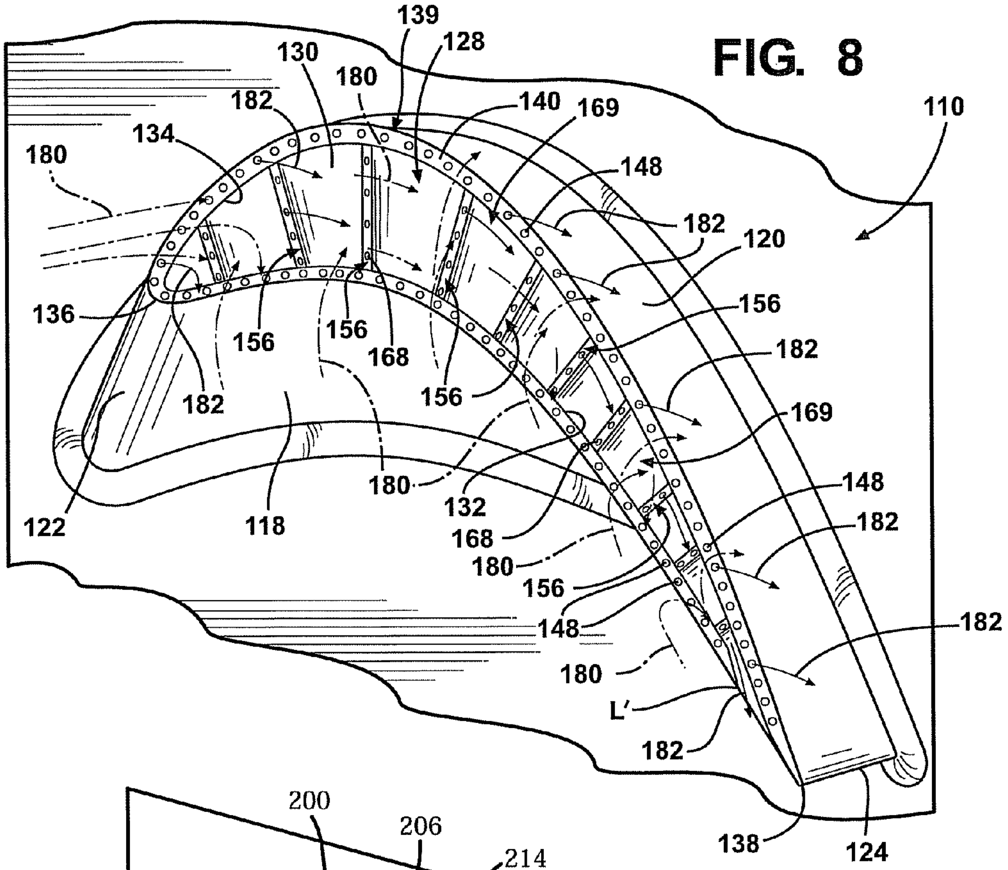
FIG. 8 is a top view of a turbine blade constructed in accordance with another embodiment of the present invention.
Figure 9:
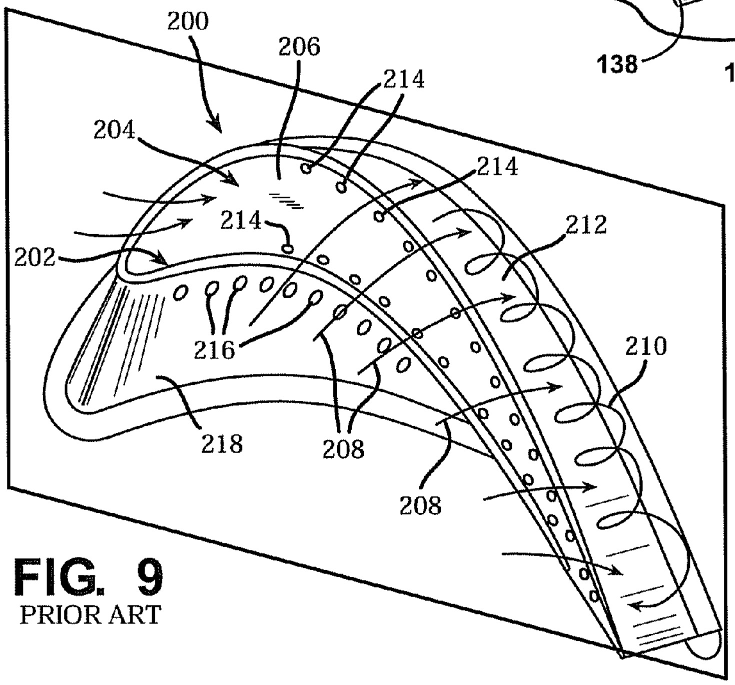
FIG. 9 PRIOR ART
FIG. 9 is a view of a prior art airfoil.

Referring to FIG. 8, a turbine blade 110 includes a squealer tip 139 according to another embodiment of the invention, where structure similar to that described above with reference to FIGS. 5, 6, 6A, 7, and 7A includes the same reference number. In this embodiment, the squealer tip 139 comprises a squealer tip rail 140 that extends radially outwardly from a blade tip floor 130 and extends along a suction side 134 of a squealer tip section 128 from a first location adjacent to an airfoil trailing edge 124 that corresponds to a blade tip section trailing edge 138, to a second location adjacent to an airfoil leading edge 122 that corresponds to a blade tip section leading edge 136. The squealer tip rail 140 also extends from the airfoil leading edge 122 substantially along a pressure side 132 of the squealer tip section 128. The portion of the squealer tip rail 140 that extends along the pressure side 132 terminates at a third location L' adjacent to the airfoil trailing edge 124.

A plurality of ramped fence members 156 of the squealer tip 139 according to this embodiment extend radially outwardly from the blade tip floor 130 and span between the portion of the squealer tip rail 140 that extends along the suction side 134 to the portion of the squealer tip rail 140 that extends along the pressure side 132.

First cooling holes (not shown) formed in the squealer tip rail 140 communicate with respective openings 148 formed in the squealer tip rail 40 to provide cooling fluid to cool the squealer tip section 128, as described above for FIGS. 5, 6, 6A, 7, and 7A. The cooling fluid is designated by solid line arrows 182 in FIG. 8. It is noted that the cooling fluid 182 provided by the cooling holes formed in the portion of the squealer tip rail 140 adjacent the pressure side 132 may flow into pockets 169 of the blade tip section 128 to provide cooling to the structure of the squealer tip section 128. The pockets 169 are formed in the squealer tip section 128 between the squealer tip rail 140 and the fence members 156.

Cooling fluid provided by second cooling holes (not shown) formed in the fence members 156 communicate with respective openings 168 formed in the fence members 156 to deliver cooling fluid 182 that is used to cool the squealer tip section 128, as described above for FIGS. 5, 6, 6A, 7, and 7A.

Remaining structure of the blade 110 according to this embodiment is substantially identical to that described above with reference to FIGS. 5, 6, 6A, 7, and 7A. However, during operation, hot working gases 180, designated by dotted-dashed arrows 180 in FIG. 8, that flow radially outwardly along a pressure side 118 of the blade, must pass over both the portion of the squealer tip rail 140 located along the pressure side 132 and the portion of the squealer tip rail 140 located along the suction side 134 (and any fence members 156 that the hot working gases 180 may encounter) to reach a suction side 120 of the blade. Thus, it is believed that the squealer tip 139 according to this embodiment provides increased resistance to leakage of hot working gases 180 over the squealer tip section 128 to the blade suction side 120.

It is noted that, while the squealer tips 39, 139 illustrated in the embodiments described herein each include various cooling holes, i.e., first cooling holes 44, 144 in the squealer tip rails 40, 140 and second cooling holes 65, 166 in the fence members 56, 156, that provide cooling fluid to structure to be cooled within the blade tip sections 28, 128, the squealer tips 39, 139, need not include cooling holes 44, 144, 65, 166 in certain applications. For example, the cooling holes 44, 144, 65, 166 and their corresponding cooling fluid need not be present in lower temperature engines that do not require cooling of the structure proximate the squealer tip section 28, 128.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A turbine blade comprising:

an airfoil including an airfoil outer wall extending radially outwardly from a blade root;

a blade tip section including a blade tip floor located at an end of said airfoil distal from said root, said blade tip floor including a pressure side and a suction side joined together at chordally spaced apart leading and trailing edges of said airfoil; and a squealer tip extending radially outwardly from said blade tip floor, said squealer tip comprising:

a squealer tip rail located adjacent to said suction side and extending from a first location adjacent to said airfoil trailing edge to a second location adjacent to said airfoil leading edge; and a plurality of chordally spaced fence members located between said airfoil leading and trailing edges, each of said fence members extending from said squealer tip rail toward said pressure side, wherein said fence members are angled in a radial direction toward said airfoil leading edge.

2. The blade of claim 1, wherein said airfoil includes a supply of cooling fluid and further comprising a plurality of first cooling holes formed in said squealer tip rail in fluid communication with said supply of cooling fluid, said first cooling holes each including an opening located adjacent to a radially outer end of said squealer tip rail for providing a flow of a first portion of cooling fluid, said first portion of cooling fluid providing cooling to said squealer tip rail.

3. The blade of claim 2, further comprising a plurality of second cooling holes provided in said fence members in fluid communication with said supply of cooling fluid, said second cooling holes each including an opening located adjacent to a radially outer end of a respective fence member for providing a flow of a second portion of cooling fluid, said second portion of cooling fluid providing cooling to said fence members and said squealer tip rail, wherein at least a portion of said second portion of cooling fluid exits said first cooling holes and flows into pockets formed between adjacent fence members to provide cooling to said blade tip floor.

4. The blade of claim 1, wherein said squealer tip rail further extends along said pressure side from said second location adjacent to said airfoil leading edge to a third location adjacent said airfoil trailing edge.

5. The blade of claim 1, wherein said fence members are curved in an axial direction, a concave side of each of said curved fence members facing said airfoil leading edge.

6. The blade of claim 1, wherein each of said fence members comprises a leading edge facing radially extending surface and a trailing edge facing ramped surface defining a serrated tip surface of said blade tip section, said radially extending surfaces extend from said blade tip floor at a first radial location to a second radial location radially outwardly from said first radial location, wherein said ramped surfaces are angled radially outwardly toward said airfoil leading edge from said first radial location to said second radial location.

7. The blade of claim 6, wherein said second radial location defines a radially outermost edge of the turbine blade, and wherein a radially outer edge of said squealer tip rail is located at a radial location substantially corresponding to said second radial location.

8. The blade of claim 6, wherein said airfoil includes a supply of cooling fluid and further comprising a plurality of cooling holes extending in a chordwise direction through said fence members, generally parallel to said ramp surfaces, said cooling holes each including an opening located in a respective one of said radially extending surfaces adjacent to said second radial location.

9. The blade of claim 1, wherein said fence members extend from said squealer tip rail substantially to said pressure side, said fence members define continuously open pockets extending from said squealer tip rail and having an open side adjacent to said pressure side.

10. The blade of claim 1, wherein each of said fence members includes a radially inner base portion that is chordally offset from a radially outer portion of said corresponding fence member.

11. The blade of claim 10, wherein said radially outer portion of each said fence member is closer to said airfoil leading edge than said corresponding radially inner base portion at the same axial location.

12. A turbine blade comprising:

an airfoil including an airfoil outer wall extending radially outwardly from a blade root;

a blade tip section including a blade tip floor located at an end of said airfoil distal from said root, said blade tip floor including a pressure side and a suction side joined together at chordally spaced apart leading and trailing edges of said airfoil;

a squealer tip extending radially outwardly from said blade tip floor, said squealer tip comprising:

a squealer tip rail located adjacent to said suction side and extending from a first location adjacent to said airfoil trailing edge to a second location adjacent to said airfoil leading edge;

a plurality of chordally spaced fence members located between said airfoil leading and trailing edges, each of said fence members extending from said squealer tip rail substantially to said pressure side, wherein said fence members are curved in an axial direction, a concave side of each of said curved fence members facing said airfoil leading edge, and wherein said fence members define continuously open pockets extending from said squealer tip rail and having an open side adjacent to said pressure side.

13. The blade of claim 12, wherein said airfoil includes a supply of cooling fluid and further comprising a plurality of first cooling holes provided in said squealer tip rail in fluid communication with said supply of cooling fluid, said first cooling holes each including an opening located adjacent to a radially outer end of said squealer tip rail for providing a flow of a first portion of cooling fluid, said first portion of cooling fluid providing cooling to said squealer tip rail.

14. The blade of claim 13, further comprising a plurality of second cooling holes provided in said fence members in fluid communication with said supply of cooling fluid, said second cooling holes each including an opening located adjacent to a radially outer end of a respective fence member for providing a flow of a second portion of cooling fluid, said second portion of cooling fluid providing cooling to said fence members and said squealer tip rail, wherein at least a portion of said second portion of cooling fluid exits said second cooling holes and flows into said pockets to provide cooling to said blade tip floor.

15. The blade of claim 12, wherein said fence members are angled in a radial direction toward said airfoil leading edge.

16. A turbine blade comprising:

an airfoil including an airfoil outer wall extending radially outwardly from a blade root;

a blade tip section including a blade tip floor located at an end of said airfoil distal from said root, said blade tip floor including a pressure side and a suction side joined together at chordally spaced apart leading and trailing edges of said airfoil;

a squealer tip extending radially outwardly from said blade tip floor, said squealer tip comprising:

a squealer tip rail located adjacent to said suction side and extending from a first location adjacent to said airfoil trailing edge to a second location adjacent to said airfoil leading edge; and a plurality of chordally spaced fence members located between said airfoil leading and trailing edges, each of said fence members extending from said squealer tip rail toward said pressure side, wherein said fence members comprise a leading edge facing radially extending surface and a trailing edge facing ramped surface defining a serrated tip surface of said blade tip section, said radially extending surfaces extend from said blade tip floor at a first radial location to a second radial location radially outwardly from said first radial location, wherein said ramped surfaces are angled radially outwardly toward said airfoil leading edge from said first radial location to said second radial location.

17. The blade of claim 16, wherein said airfoil includes a supply of cooling fluid and further comprising a plurality of first cooling holes provided in said squealer tip rail in fluid communication with said supply of cooling fluid, said first cooling holes each including an opening located adjacent to a radially outer end of said squealer tip rail for providing a flow of a first portion of cooling fluid, said first portion of cooling fluid providing cooling to said squealer tip rail.

18. The blade of claim 17, further comprising a plurality of second cooling holes extending in a chordwise direction through said fence members, generally parallel to said ramp surfaces, said second cooling holes each including an opening located in a respective one of said radially extending surfaces adjacent to said second radial location for providing a flow of a second portion of cooling fluid, said second portion of cooling fluid providing cooling to said fence members and said squealer tip rail, wherein at least a portion of said second portion of cooling fluid exits said second cooling holes pushes at least a portion of hot gas flowing over said blade tip floor away from corresponding ones of said radially extending surfaces.

19. The blade of claim 16, wherein said second radial location defines a radially outermost edge of the turbine blade, and wherein a radially outer edge of said squealer tip rail is located at a radial location substantially corresponding to said second radial location.

20. The blade of claim 16, wherein said squealer tip rail further extends along said pressure side from said second location adjacent to said airfoil leading edge to a third location adjacent said airfoil trailing edge.

* * * * *